United States Patent
Zumsteg

(10) Patent No.: US 9,471,813 B2
(45) Date of Patent: *Oct. 18, 2016

(54) PORTABLE ENCODED INFORMATION READING TERMINAL CONFIGURED TO ADJUST TRANSMIT POWER LEVEL

(71) Applicant: HAND HELD PRODUCTS, INC., Fort Mill, SC (US)

(72) Inventor: Philip Zumsteg, Shorewood, MN (US)

(73) Assignee: HAND HELD PRODUCTS, INC., Fort Mill, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/677,140

(22) Filed: Apr. 2, 2015

(65) Prior Publication Data

US 2015/0220761 A1 Aug. 6, 2015

Related U.S. Application Data

(63) Continuation of application No. 13/451,959, filed on Apr. 20, 2012, now Pat. No. 9,013,275.

(51) Int. Cl.
*H04Q 9/00* (2006.01)
*G06K 7/00* (2006.01)
*G06K 7/10* (2006.01)

(52) U.S. Cl.
CPC .......... *G06K 7/0004* (2013.01); *G06K 7/10128* (2013.01); *G06K 7/10217* (2013.01); *H04Q 9/00* (2013.01); *H04Q 2209/47* (2013.01)

(58) Field of Classification Search
CPC .. H04Q 9/00; H04Q 2209/47; G06K 7/0004; G06K 7/10217; G06K 7/10128

USPC .................................. 340/10.1, 10.5, 572.4
See application file for complete search history.

(56) References Cited

U.S. PATENT DOCUMENTS

| | | | |
|---|---|---|---|
| 5,294,931 A | 3/1994 | Meier | |
| 5,778,309 A * | 7/1998 | Tuttle | H04W 52/48 340/10.34 |
| 6,486,769 B1 * | 11/2002 | McLean | G06K 7/0008 340/10.1 |
| 6,659,344 B2 | 12/2003 | Otto et al. | |
| 7,003,138 B2 | 2/2006 | Wilson | |
| 7,015,967 B1 | 3/2006 | Kochi et al. | |
| 7,237,721 B2 | 7/2007 | Bilcu et al. | |
| 7,308,158 B2 | 12/2007 | Herbert et al. | |
| 7,405,662 B2 | 7/2008 | Steinke et al. | |
| 7,407,096 B2 | 8/2008 | McQueen et al. | |
| 7,494,063 B2 | 2/2009 | Kotlarsky et al. | |

(Continued)

OTHER PUBLICATIONS

EPC Global, Specification for RFID Air Interface, EPC Radio-Frequency Identity Protocols Class-1 Generation-2 UHF RFID Protocol for Communications at 860 MHz, Version 1.0.9, Jan. 31, 2005, pp. 1-94.

(Continued)

*Primary Examiner* — Edwin Holloway, III
(74) *Attorney, Agent, or Firm* — Oliff PLC; R. Brian Drozd

(57) ABSTRACT

A system and method of adjusting the transmission strength emitted by an integrated RFID reader. The system may stores the location of the RFID when moved proximate to an object as a point of origin. When the RFID reader moves relative to the point of origin, the system may determine the distance of the RFID reader from the point of origin and may adjust the power level of the RFID reader relative to this distance.

20 Claims, 13 Drawing Sheets

(56) References Cited

U.S. PATENT DOCUMENTS

| | | | |
|---|---|---|---|
| 7,501,950 B2 | 3/2009 | Suzuki | |
| 7,535,361 B2 | 5/2009 | Doan et al. | |
| 7,551,090 B2 | 6/2009 | Doan et al. | |
| 7,602,288 B2 | 10/2009 | Broussard | |
| 7,627,191 B2 | 12/2009 | Xu et al. | |
| 7,677,602 B2 | 3/2010 | Bennett et al. | |
| 7,696,874 B2 | 4/2010 | Stevens | |
| 7,702,187 B2 | 4/2010 | Rusman et al. | |
| 7,708,205 B2 | 5/2010 | Kotlarsky et al. | |
| 7,735,731 B2 | 6/2010 | Skaaksrud et al. | |
| 7,756,292 B2 | 7/2010 | Lev | |
| 7,756,319 B2 | 7/2010 | Odell | |
| 7,786,865 B2 | 8/2010 | Park | |
| 7,786,925 B1 | 8/2010 | Knibbe et al. | |
| 7,815,121 B2 | 10/2010 | Kotlarsky et al. | |
| 7,821,400 B2 | 10/2010 | Tabet et al. | |
| 7,831,082 B2 | 11/2010 | Holsing et al. | |
| 7,855,643 B2 | 12/2010 | Tuttle | |
| 7,870,999 B2 | 1/2011 | Skaaksrud et al. | |
| 7,883,013 B2 | 2/2011 | Skaaksrud et al. | |
| 7,886,972 B2 | 2/2011 | Skaaksrud et al. | |
| 7,951,003 B2 | 5/2011 | Russell et al. | |
| 7,961,908 B2 | 6/2011 | Tzur et al. | |
| 7,965,186 B2 | 6/2011 | Downie et al. | |
| 8,115,601 B2 | 2/2012 | Nonaka | |
| 8,149,094 B2 | 4/2012 | Deoalikar et al. | |
| 8,727,225 B2 * | 5/2014 | Zumsteg | G06K 7/10009 235/454 |
| 9,013,275 B2 * | 4/2015 | Zumsteg | H04Q 9/00 340/10.1 |
| 2002/0165758 A1 | 11/2002 | Hind et al. | |
| 2005/0212817 A1 | 9/2005 | Cannon et al. | |
| 2006/0176152 A1 * | 8/2006 | Wagner | G06K 7/0008 340/10.2 |
| 2006/0262961 A1 | 11/2006 | Holsing et al. | |
| 2006/0266836 A1 | 11/2006 | Bilcu et al. | |
| 2006/0267733 A1 | 11/2006 | Steinke et al. | |
| 2007/0008136 A1 | 1/2007 | Suzuki | |
| 2007/0018793 A1 * | 1/2007 | Stewart | G06K 7/0008 340/10.3 |
| 2007/0102506 A1 | 5/2007 | Stevens | |
| 2007/0199995 A1 | 8/2007 | Kotlarsky et al. | |
| 2007/0215706 A1 | 9/2007 | Kotlarsky et al. | |
| 2008/0037899 A1 | 2/2008 | Xu et al. | |
| 2008/0061937 A1 | 3/2008 | Park | |
| 2008/0111661 A1 | 5/2008 | Lin et al. | |
| 2008/0164313 A1 | 7/2008 | Kotlarsky et al. | |
| 2008/0164317 A1 | 7/2008 | Kotlarsky et al. | |
| 2008/0169343 A1 | 7/2008 | Skaaksrud et al. | |
| 2008/0172303 A1 | 7/2008 | Skaaksrud et al. | |
| 2008/0173706 A1 | 7/2008 | Skaaksrud et al. | |
| 2008/0173710 A1 | 7/2008 | Skaaksrud et al. | |
| 2008/0203147 A1 | 8/2008 | Skaaksrud et al. | |
| 2008/0203166 A1 | 8/2008 | Skaaksrud et al. | |
| 2008/0210749 A1 | 9/2008 | Skaaksrud et al. | |
| 2008/0210750 A1 | 9/2008 | Skaaksrud et al. | |
| 2008/0224870 A1 | 9/2008 | Yeo et al. | |
| 2008/0285091 A1 | 11/2008 | Skaaksrud et al. | |
| 2009/0021353 A1 | 1/2009 | Nonaka | |
| 2009/0040025 A1 | 2/2009 | Volpi et al. | |
| 2009/0045913 A1 | 2/2009 | Nelson et al. | |
| 2009/0045924 A1 | 2/2009 | Roberts, Sr. et al. | |
| 2009/0121025 A1 | 5/2009 | Romanchik | |
| 2009/0161964 A1 | 6/2009 | Tzur et al. | |
| 2009/0243801 A1 | 10/2009 | Strzelczyk | |
| 2009/0245755 A1 | 10/2009 | Lee et al. | |
| 2009/0322537 A1 | 12/2009 | Tapp et al. | |
| 2010/0045436 A1 | 2/2010 | Rinkes | |
| 2010/0073487 A1 | 3/2010 | Sogoh et al. | |
| 2010/0109844 A1 | 5/2010 | Carrick et al. | |
| 2010/0109903 A1 | 5/2010 | Carrick | |
| 2010/0141395 A1 * | 6/2010 | Nagai | G06K 7/0008 340/10.4 |
| 2010/0142825 A1 | 6/2010 | Maxwell et al. | |
| 2010/0148985 A1 | 6/2010 | Lin et al. | |
| 2010/0201488 A1 | 8/2010 | Stern et al. | |
| 2010/0201520 A1 | 8/2010 | Stern et al. | |
| 2010/0220894 A1 | 9/2010 | Ackley et al. | |
| 2010/0226530 A1 | 9/2010 | Lev | |
| 2010/0232712 A1 | 9/2010 | Tomita et al. | |
| 2010/0252621 A1 | 10/2010 | Ito et al. | |
| 2010/0271187 A1 | 10/2010 | Uysal et al. | |
| 2010/0296753 A1 | 11/2010 | Ito et al. | |
| 2010/0303348 A1 | 12/2010 | Tolliver et al. | |
| 2010/0308964 A1 | 12/2010 | Ackley et al. | |
| 2011/0052008 A1 | 3/2011 | Holsing et al. | |
| 2011/0084808 A1 | 4/2011 | Tuttle | |
| 2011/0115947 A1 | 5/2011 | Oh | |
| 2011/0128125 A1 | 6/2011 | Kai et al. | |
| 2011/0143811 A1 | 6/2011 | Rodriguez | |
| 2011/0205387 A1 | 8/2011 | Tzur et al. | |
| 2011/0212717 A1 | 9/2011 | Rhoads et al. | |
| 2011/0280447 A1 | 11/2011 | Conwell | |
| 2011/0284625 A1 | 11/2011 | Smith et al. | |
| 2011/0290883 A1 | 12/2011 | Kotlarsky et al. | |
| 2011/0316675 A1 * | 12/2011 | Tsujimoto | G06K 7/10079 340/10.4 |

OTHER PUBLICATIONS

U.S. Appl. No. 13/359,005 enititled "Portable RFID Reading Terminal With Visual Indication of Scan Trace" filed on Jan. 26, 2012.

U.S. Appl. No. 13/452,133 entitled "System and Method for Calibration and Mapping of Real-Time Location Data" filed Apr. 20, 2012.

U.S. Appl. No. 13/451,744 enititle "Portable Encoded Information Reading Terminal Configured to Acquire Images" filed Apr. 20, 2012.

U.S. Appl. No. 13/451,761 entitled "Portbale Encoded Information Reading Terminal Configured to Locate Groups of RFID Tags" filed Apr. 20, 2012.

U.S. Appl. No. 13/474,014 entitled "Cloud-Based System for Reading of Decodable Indicia" filed May 17, 2012.

U.S. Appl. No. 13/545,454 entitled "Cloud-Based System for Processing of Decodable Indicia" filed Jul. 10, 2012.

\* cited by examiner

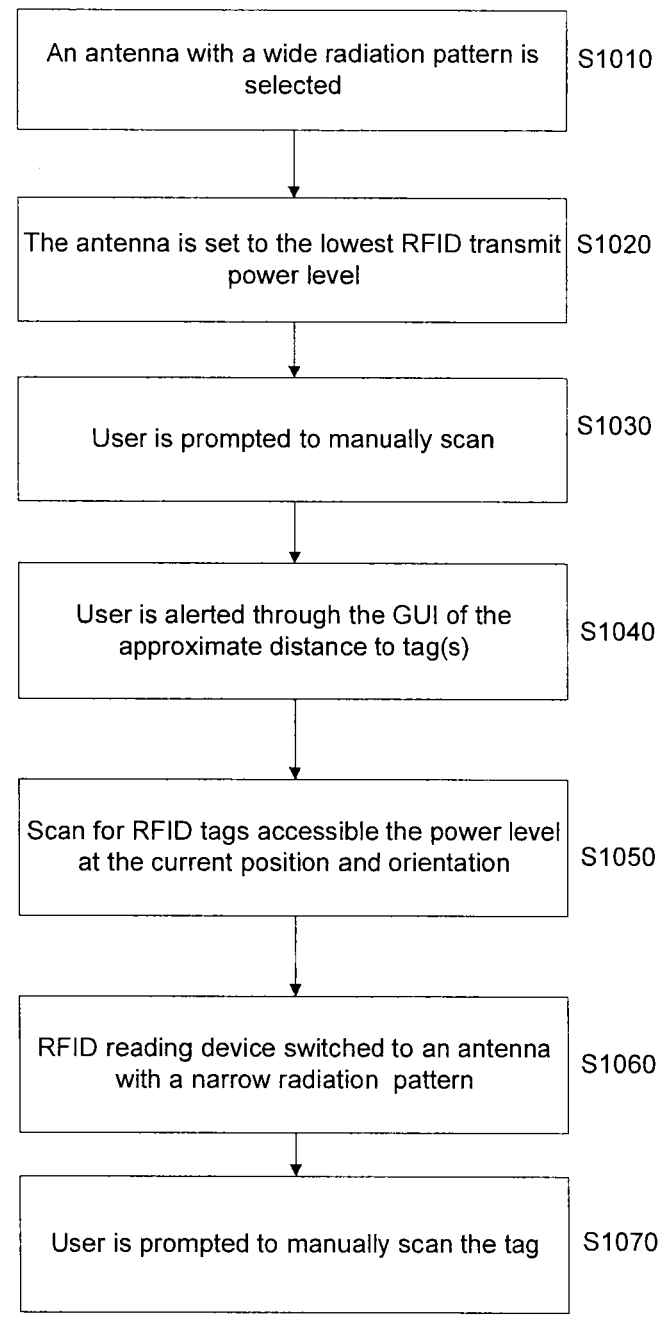

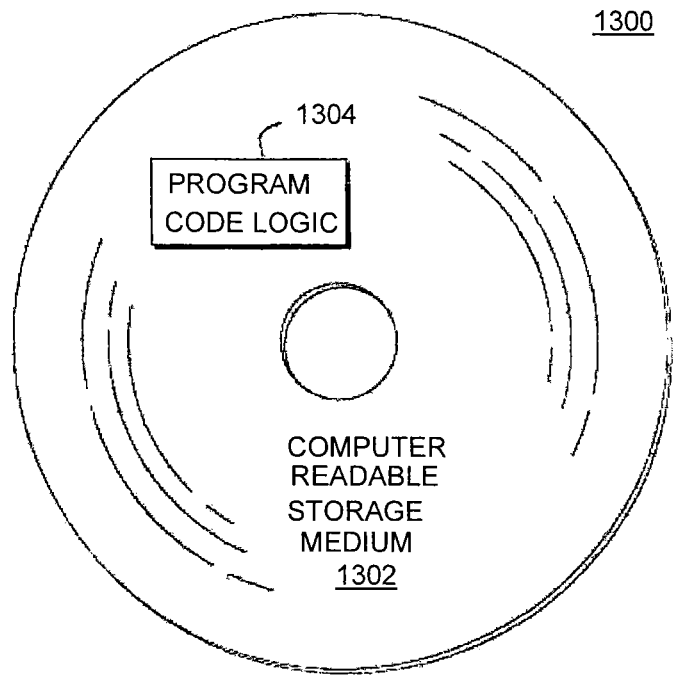

PORTABLE ENCODED INFORMATION READING TERMINAL CONFIGURED TO ADJUST TRANSMIT POWER LEVEL

This is a Continuation of application Ser. No. 13/451,959 filed Apr. 20, 2012. The disclosure of the prior application is hereby incorporated by reference herein in its entirety.

FIELD OF INVENTION

The present invention relates to a system and method of adjusting the transmission strength emitted by an RFID reader.

BACKGROUND OF INVENTION

Radio-frequency identifier (RFID) methods are widely used in a number of applications, including smart cards, item tracking in manufacturing, inventory management in retail, etc. An RFID tag can be attached, e.g., to an inventory item. An EIR terminal can be configured to read the memory of an RFID tag attached to an inventory item.

EIR terminals with integrated RFID reading capabilities can read RFID tags from a range of distances and various terminal orientations with respect to an RFID tag being read. When an EIR terminal comprising an RFID reader is configured to display a scan trace, it provides the EIR terminal's operator with a visual feedback with respect to the scanning progress. At any moment in time, the RF signal coverage emitted by an EIR terminal can be defined by a 3D shape. The form and size of the 3D shape defining the RF signal coverage depends, among other factors, on the orientation of the EIR terminal, the RFID transmit power level, and the number and configuration of the RF antennas employed by the EIR terminal. Hence, a target scan area by an EIR terminal can be visualized as a projection of the 3D RF signal coverage shape onto an arbitrarily chosen plane.

For a moving EIR terminal, a visual scan trace can be provided by different graphical representations such as a solid line, continuous line, or a dotted line, each line defined by a multitude of time varying points, each point being a projection of the 3D RF signal coverage shape onto the arbitrarily chosen plane at a given moment in time. The imaginary plane onto which the visual scan trace is projected can be chosen to intersect a physical structure containing a plurality of items to be inventoried, and thus the scan trace can be overlaid over an image of the physical structure.

RFID readers usually offer improved efficiency over bar code scanning devices for retail inventory, by being capable of reading multiple RFID tags that are within range of the RF signal transmitted by an RFID reader. A downside to this multiple-read capability is lack of scanned items localization, due to insufficient correlation between where the RFID reader is located or oriented, and the RFID tags being read. Retail inventory management typically requires more than 90% of the RFID tags present in a department to be successfully acquired during the inventory process. When this high accuracy is not achieved, it is currently necessary to rescan the entire department, since the locations of any unread RFID tags are unknown.

When items are scanned using an RFID reader, the antenna of this device transmits a signal. The longevity of use of an EIR terminal with an RFID reader is impacted by the transmit power level utilized in scanning RFID tags. The distance at which an RFID tag may be read by an RFID reader is proportional to the transmit power level emitted by the RFID reader. Thus, an RFID reader using a higher transmit power level than required may have the unintended effect of unintentionally scanning RFID tags that are proximate to the tags that the user desires to scan.

A need exists for a method and system for reading RFID tags that conserves the power of the device and increases the accuracy when scanning select RFID tags.

SUMMARY OF INVENTION

An object of the present invention is to increase profits by efficiently and effectively tracking inventory so that sales are not lost because items are unexpectedly out of stock due to inventory errors. When merchants do not purchase popular products under the mistaken impression that these products are still in stock, potential sales are lost.

Another object of the present invention is to simplify the effort required to track inventory.

Another object of the present invention is to extend the battery life of an EIR terminal by increasing the efficiency of the power utilized by an integrated RFID reader.

Another object of the present invention is to increase the accuracy of an RFID reader by selecting a power level based upon the distance of the RFID tags that will be scanned.

Another object of the present invention is to maximize the number of desired RFID tags read a given point in time by an RFID reader.

Another object of the present invention is to minimize the coverage on a physical structure of a transmitted RFID signal to better determine the scan path of an RFID reader in an EIR terminal.

Another object of the present invention is to better focus the RFID transmission to avoid reading RFID tags on adjacent physical structures.

An embodiment of the present invention includes the following components: 1) an EIR terminal configured to read RFID tags; 2) an EIR terminal configured to enable control of the RFID reader transmit power level, and 3) data regarding the overall dimensions of a physical structure for which a scan trace is to be displayed and the coordinates of an initial reference point on this physical structure.

In embodiments of the present invention, the dimension data for a given physical structure can be stored in at least one database, or it can be available as part of a custom bar code and/or RFID tag affixed to the physical structure. In an embodiment of the present invention, when the dimension data is stored in one or more databases, it is indexed by a value in a custom bar code and/or RFID tag affixed to the physical structure and accessed by the EIR terminal upon scanning this value.

An embodiment of the present invention utilizes an EIR terminal with a graphical user interface (GUI). This EIR terminal is configured to scan/read RFID tags and images of decodable indicia, such as barcodes. The ER terminal is augmented with an imaging device, positioning package, including but not limited to, a 3-axis (3 dimensional) accelerometer package, and a 9-DOF (degree of freedom) IMU (Inertial Measurement Unit) containing a 3-axis accelerometer, a 3-axis magnetometer, and 3-axis gyroscope sensors, to acquire movement and position calibration data regarding the motion of the EIR terminal. The mechanism to scan bar codes includes but is not limited to optical scanners and/or image capture devices, such as cameras.

In addition to the 3D accelerometer suite, in an embodiment of the present invention, a 3-axis magnetometer is integrated into an ER terminal. The magnetometer, which acts in part as a compass, is integrated into the software of the EIR terminal and executed on a processor in the EIR terminal. In another embodiment of the present invention, the magnetometer is integrated as a hardware component.

The magnetometer tracks the movement of the EIR terminal, in three dimensions, through space by collecting data regarding the changes in the magnetic field around the ER terminal. Thus, together with the accelerometer package, the magnetometer is also involved in determining both the motion and the orientation of the ER terminal.

A 3-axis gyroscope sensor is integrated into an embodiment of the present invention. The gyroscope aids the 3D accelerometer in determining motion and orientation because the gyroscope allows the calculation of orientation and rotation. This addition of the gyroscope sensor provides a more accurate recognition of movement within a 3D space than the lone accelerometer package.

An embodiment of the present invention employs an integrated 3-axis accelerometer suite, 3-axis magnetometer, and a 3-axis gyroscope sensor. Together, these components provide data regarding the location of the EIR terminal while moving through space.

In another embodiment of the present invention, an integrated 3-axis accelerometer suite, 3-axis magnetometer, and a 3-axis gyroscope sensor are employed to provide data regarding both the location and the orientation of the EIR terminal as it moves through space.

An embodiment of the present invention utilizes a custom bar coding scheme for physical structures. Each custom bar code is encoded with data that describes the physical structure (e.g., display and/or storage mechanism) used to display and/or store inventory, including but not limited to a reference identifier, the dimensions of the physical space, number of shelves, display surfaces, and/or hanging racks on each physical structure.

An embodiment of the present invention utilizes an RFID-tagging scheme for physical structures. In this embodiment, each custom RFID tag contains data that describes the physical structure (e.g., display and/or storage mechanism) used to display and/or store inventory, including but not limited to a reference identifier, the dimensions of the physical space, number of shelves, display surfaces, and/or hanging racks on each physical structure.

As aforementioned, data describing the physical structure encoded in either a custom bar code and/or on an RFID tag may provide the full dimensional data for a physical structure, or may provide a reference that can be used by the EIR terminal via a communication connection to obtain the full information from a data source. In an embodiment of the present invention that utilizes a database or group of databases, including but not limited to one or more remote databases or one or more local databases, to retrieve the dimensions of a given physical structure, the records stored in the one or more databases are indexed by the decoded values of images of decodable indicia scanned by a bar code reader and/or signals from an RFID receiver/reader in the EIR terminal.

In an embodiment of the present invention, the bar code scanning capability of the EIR terminal and/or the RFID reading capability of the EIR terminal is utilized to scan a custom bar code or RFID tag affixed to the physical structure. The EIR terminal, upon decoding the data in the bar code and/or reading the data on the RFID tag, queries a database to obtain additional information about the physical structure that the encoded data represents.

In an embodiment of the present invention, a "scan and tap" method is utilized to map the location of at least one object in three dimensional space, relative to an initial point in three dimensional space. When an EIR terminal scans a signal of decodable indicia, such as a bar code or RFID tag, this EIR terminal reads the coordinates of the signal source in the local reference frame. By tapping the EIR terminal, the resultant spike in the accelerometer data is used to set the initial point coordinates (x0, y0, z0) and store these coordinates in a memory, including but not limited to, a memory resource in the EIR terminal itself, or an external resource accessible to the EIR terminal via a communications connection. In the reference frame of the EIR terminal, the coordinates are set to (0,0,0). Thus, as the EIR terminal moves through three-dimensional space, motion with respect to the EIR terminal's own (0,0,0) can be mapped to the local reference frame using the initial point coordinates (x0, y0, z0). In an embodiment of the present invention, the local reference frame is aligned with respect to the physical structure.

In another embodiment of the present invention, the EIR terminal integrated with an IMU (containing a 3-axis accelerometer, a 3-axis magnetometer, and 3-axis gyroscope sensors) is utilized to record both the location of the EIR terminal in three dimensional space and record the initial point coordinates, the IMU also assists the EIR terminal in determining the orientation of the EIR terminal, both during the "tap" and as it moves through space. The orientation of the EIR terminal describes the position of the EIR terminal itself. For example, an EIR terminal can be at a given location, for example (x0,y0,z0) but the orientation of the EIR terminal at this location may vary. The EIR terminal may be held perfectly upright at this location and that is one orientation, but the EIR terminal may also be held at an angle relative to any direction in three dimensional space. This angle would represent a different orientation. In this embodiment, the "tap" and when the EIR terminal in moved relative to the initial point, both the location of the EIR terminal and the orientation of the terminal are stored in a resource, including but not limited to an internal resource in the EIR terminal and/or an external memory resource accessible to the EIR terminal via a communications connection.

In an embodiment of the present invention, the EIR terminal utilizes the motion-tracking data and the initial reference point that is established in the "scan and tap" process to determine the distance between the RFID reader's antenna and the physical display and any merchandise located on the physical display.

In an embodiment of the present invention, the EIR terminal utilizes the determined distance from the physical structure and/or the merchandise displayed on the physical structure to adjust the RFID transmit power level to the minimum necessary to scan RFID tags on the merchandise on the physical display.

In an embodiment of the present invention, the EIR terminal's RFID reader is utilized to locate a specific RFID tag and/or all RFID tags in a given vicinity.

In an embodiment of the present invention, the EIR terminal's RFID reader transmit power level is adjusted to the minimum power level necessary to read RFID tags on the merchandise of the physical display.

In an embodiment of the present invention, the RFID transmit power level is dynamically readjusted in response to external conditions, including but not limited to, the passage of a time interval, a change in the distance between the EIR terminal and the physical structure, and/or the number of RFID tags read and/or not read.

Although the present invention has been described in relation to utilizing motion-tracking data and an established initial point to determine the distance between an RFID antenna and a physical display and the merchandise on the display, many other variations and modifications will become apparent to those skilled in the art.

BRIEF DESCRIPTION OF DRAWINGS

FIG. 10 depicts a workflow of an aspect of an embodiment of the present invention.

FIG. 13 depicts a computer program product incorporating one or more aspects of the present invention.

DETAILED DESCRIPTION OF THE INVENTION

Figure 1:
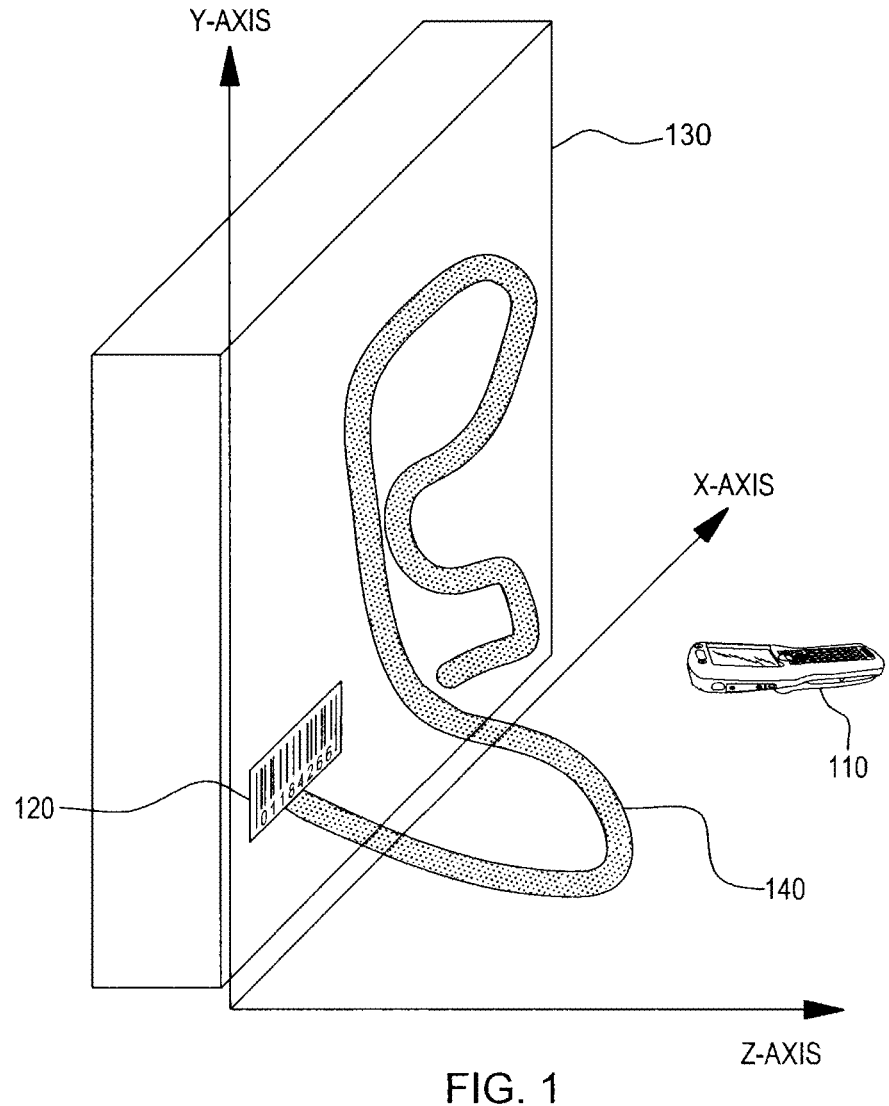
FIG. 1 depicts an embodiment of and aspect of the present invention.

The present system and method utilizes information regarding the number of RFID tags read at a given transit power level, to adjust the RFID transmit power level of an integrated RFID reader to the minimum level necessary to read RFID tags situated proximate to the physical structure.

U.S. patent application Ser. No. 13/359,005, entitled "Portable RFID Reading Terminal with Visual Indication of Scan Trace", filed Jan. 26, 2012 and commonly assigned, which is incorporated herein by reference in its entirety, describes and claims an EIR terminal configured to read RFID tags and display a scan trace, thus providing the terminal's operator with a visual feedback with respect to the scanning progress. The terminal relies upon certain information when creating the visual feedback, this information includes, but is not limited to, the physical characteristics of a physical structure used to store or display inventory, the movement and orientation of the EIR terminal relative to the physical structure, establishing an initial point of movement, and mapping the movement and orientation of the EIR terminal relative to the physical structure to the GUI display.

Depending upon the embodiment of the present invention, the transmit power level of an RFID reader is adjusted both with and without the benefit of motion-tracking data.

Motion-tracking data is acquired by an embodiment of the present invention, when the motion of the EIR terminal is sensed by a 3-axis accelerometer package. Bringing the EIR terminal into a mechanical contact with a stationary object results in a distinctive spike in the data returned by the 3-axis accelerometer package, due to the sudden change in acceleration and velocity to zero. At the point of contact, the initial distance between the EIR terminal and the stationary object is defined to be zero. The initial distances of the EIR terminal along the X-axis, Y-axis and Z-axis in the local reference frame are set to the values determined by the custom barcode and/or RFID tag that was scanned immediately prior to the occurrence of mechanical contact between the EIR terminal and the physical structure.

The 3-axis accelerometer package acquires movement and initial position calibration data for the EIR terminal. In an embodiment of the present invention, initial calibration data may be obtained directly from the custom barcode and/or RFID tag, or indirectly from a local or remote database using information on the custom barcode and/or RFID tag to access the appropriate entry in the database.

Data from the 3-axis accelerometer sensors can be used to determine the velocity and distance of motion at each point in time. Moving the accelerometer package enables only the "relative" motion of the package to be determined, with respect to the initial set of coordinates. The system and method of the present invention enables data from the accelerometer to be combined with the initial coordinates and dimensions of a selected physical structure, then utilized to determine the distance of the RFID reader in the EIR terminal from the any RFID tags on items located proximate to the physical structure, for example, merchandise tagged with RFID tags on a shelving display (physical structure).

To increase the motion-tracking data available to the EIR terminal when determining the distance between the RFID reader and the RFID tags proximate to the physical structure, in an embodiment of the present invention, the EIR terminal is additionally augmented with a 3-axis magnetometer sensors and/or a 3-axis gyroscope sensors. The data gathered by these components (integrated as hardware and/or software) augments the accelerometer data for sensing movement. Although the accelerometer alone is used during the "tap" procedure, which is discussed later, during the subsequent movements of the EIR terminal, data accumulated by the 3-axis magnetometer and/or the 3-axis gyroscope, with the 3-axis accelerometer, measure the motion and the orientation of the EIR terminal through space. For example, in an embodiment of the present invention that includes one or both of a 3-axis magnetometer and/or a 3-axis gyroscope, the data accumulated by these components is used as part of the computations to remove gravity effects from the 3-axis accelerometer data. In an embodiment of the present invention, the 3-axis magnetometer sensors and/or a 3-axis gyroscope sensors record data representing the orientation of the EIR terminal in space.

In an embodiment of the present invention, a user scans a custom bar code and/or an RFID tag on a physical structure and then "taps" the EIR terminal on that bar code or tag, to create an initial set of coordinates in the frame of reference of the physical structure for mapping subsequent movement of the EIR terminal. Thus, the X-, Y- and Z-axes are defined with respect to a physical structure. For example, when mapping a rectangular physical structure, the X-axis can represent the left-right dimensions of the physical structure, the Y-axis can represent the up-down dimensions, and Z-axis can represent the in-out dimensions (i.e., the perpendicular distance between the EIR terminal and the physical structure). This frame of reference includes the EIR terminal, following the calibration step of "tapping" the EIR terminal on the custom bar code and/or RFID tag affixed to the physical structure. If the EIR terminal is not calibrated by "tapping," the EIR terminal will only provide a relative movement data to the GUI on the EIR terminal. By "tapping" the EIR terminal at the location of the custom bar code and/or RFID tag, the EIR terminal is mapped to a known location in the "local frame of reference" used by the physical structure. As a result, subsequent motion reporting from the accelerometer package may be interpreted as motion in the "local frame of reference" and can therefore be overlaid on the physical structure image by the GUI display.

In addition to defining the location of the initial point and subsequent points, in an embodiment of the present invention, the orientation of the EIR terminal in three dimensional space is also defined. As the EIR terminal moves through space, the orientation is recorded by the EIR terminal; it is calculated using data from an IMU. As described earlier, while the location of the EIR terminal can be represented relative to an X, Y, and Z axis, as depicted in FIG. 1, an EIR terminal 110 at a specific location, at given coordinates, can have a variety of different orientations. For example, the EIR terminal 110 can be held perpendicular to the Y-axis in FIG. 1, at a 75 degree angle relative to the Y-axis, or at various orientations relative to the remainder of the axes in FIG. 1. The orientation of the EIR terminal in three dimensional space coupled with the location provides the EIR terminal with more information to describe and map its movement.

The "scan and tap" method is utilized to map the location of at least one object in three dimensional space, relative to an initial point in three dimensional space. The scan and tap procedures establish an initial point of the EIR terminal in the local reference frame. In the "scan" portion, an EIR terminal scans a signal of decodable indicia, such as a bar code or RFID tag, and this EIR terminal obtains the coordinates of the signal in the local reference frame. During the "tap," i.e., tapping the EIR terminal at the location of the signal of decodable indicia, the resultant spike in the accelerometer data is used to set the EIR terminal initial point coordinates (x0, y0, z0). In the EIR terminal reference frame, the coordinates are set to (0,0,0). Thus, as the EIR terminal moves through three-dimensional space, motion with respect to the EIR terminal's own (0,0,0), motion of the EIR terminal can be mapped to the local reference frame using the initial point coordinates (x0, y0, z0).

The motion-tracking data and the establishment of an initial point create a frame of reference that provides information about the position of the EIR terminal in space relative to the physical structure, especially the initial point on the physical structure. Using this data, in an embodiment of the present invention, the EIR terminal can determine the distance between the RFID reader (integrated into the EIR terminal) and RFID tags that are proximate to the physical structure. For example, the physical structure could be a shelving unit that is displaying sweaters. These sweaters are affixed with RFID tags. When a user holds the EIR terminal to scan the RFID tags associated with the sweaters, the merchandise, utilizing the motion-tracking data, and the coordinates of the initial point relative to the EIR terminal, the EIR terminal determines the distance from the EIR terminal to the initial point. The sweaters are in the physical structure where this initial point is located so this distance information informs the transmission level needed to read the RFID tags.

In an embodiment of the present invention, once the distance between the RFID reader and the RFID tags is determined, the EIR terminal sets the RFID transmit power level to the minimum level needed to read the RFID tags. Using a minimal level of power may increase the battery life of the EIR terminal and increases the accuracy of the scanning, as it is more targeted to the objects the user desires to scan. This concept is later illustrated in FIG. X. A higher than necessary power level increases the probability of reading RFID tags that are not on items on the physical structure.

In a further embodiment of the present invention, the transmission strength emitted by an RFID reader is adjusted without motion-tracking data, i.e., IMU data. In this embodiment, the lowest RFID transmit power is first selected. After a designated period of time, if no RFID tags have been read by the EIR terminal, the EIR terminal increases the power level to a predetermined amount. This step is repeated until either the RFID tag(s) are read, or the maximum transmit power is reached. In an embodiment of the present invention, the EIR terminal notifies the user either through a GUI and/or audibly if no tags are read at the maximum power level.

In an embodiment of the present invention, a user scans the items on the physical structure.

FIG. 1 depicts an aspect of an embodiment of the present invention In FIG. 1, the EIR terminal 110 is used to read the bar code 120 and then the EIR terminal 110 is tapped (physical contact is made) to the location of the bar code 120 on the physical structure 130. Further embodiments of the present invention employ an RFID tag instead of or in addition to a bar code. The location of the bar code 120 becomes the initial point, and is represented by the physical coordinates at which the bar code 120 is affixed to the physical structure 130. In the EIR terminal reference frame, the Z-axis coordinate is 0 at the initial point because the initial distance between the EIR terminal and the stationary object is defined to be zero; the initial point is established when the EIR terminal is in contact with the custom bar code and/or RFID tag. The initial distances along the X-axis and Y-axis are set to the values determined by the custom barcode and/or RFID tag that was scanned immediately prior to the occurrence of mechanical contact between the EIR terminal and the physical structure. Once the initial point coordinates are established, the EIR terminal can trace the movement relative to the physical structure in a local frame of reference. The wavy line 140 represents the traced movement of the EIR terminal 110.

Using the motion-tracking data and the coordinates of the bar code 120 (an initial point), the EIR terminal 110 determines the position of the EIR terminal 110 relative to the physical structure 130 and therefore, relative to any RFID tags on items (not pictured) proximate to the physical structure 130 at the current position and orientation of the EIR terminal. The position of the EIR terminal's RFID reader (not pictured) relative to the RFID tags is measured on the Z-axis in FIG. 1. Once the distance is determined, the EIR terminal sets the RFID transmit power level to the minimum level needed to read the RFID tags. In an embodiment of the present invention, the RFID transmit power level is periodically readjusted based on the computed distance between the EIR terminal and the physical structure, i.e., the initial point. For example, when a user moves the EIR terminal to a different position and the distance between the EIR terminal and the physical structure changes, the EIR terminal readjusts the power level to the minimum transmit power level at the new distance.

Figure 2:
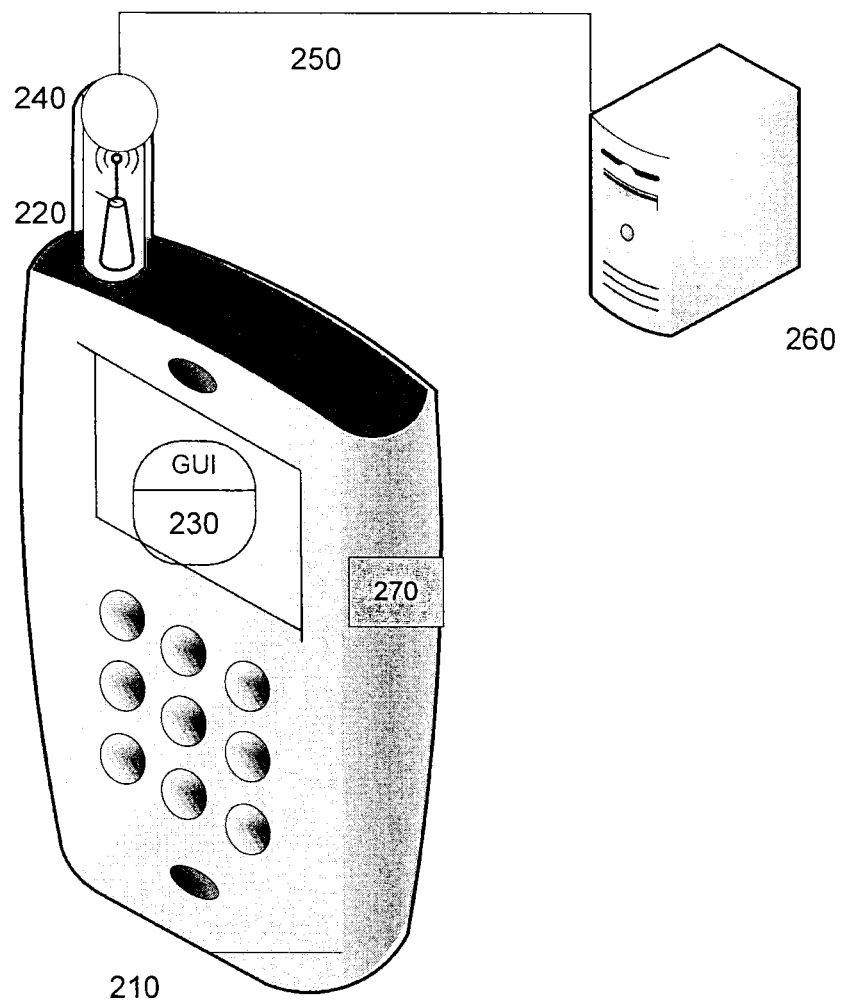
FIG. 2 depicts a technical architecture of an embodiment of the present invention.

Referring to FIG. 2, a technical architecture 200 of an embodiment of the present invention includes a hand-held EIR terminal 210 and a database 260, accessible to the EIR terminal 210 via a wireless network connection 250. The hand-held EIR terminal 210 includes an RFID reader 220, a graphical user interface (GUI) 230, a mechanism for scanning images of decodable indicia 240, such as bar codes, and is augmented with at least a 3-axis (3 dimensional) accelerometer package 270. The EIR terminal 210 is configured to enable control of the RFID reader 220 transmit power level.

Another embodiment of the present invention employs neither a wireless network connection 250 or a database 260.

In the embodiment of FIG. 2, the wireless network connection 250 and the database 260 provide information about a physical structure to the EIR terminal 210. However, in other embodiments of the present invention, this data can also be stored in a custom bar code or RFID tag that is scanned by the EIR terminal, The mechanism for scanning images of decodable indicia 240 in FIG. 2 is an optical scanner. However, further embodiments of the present invention include a camera and supporting decoding software, run either on a processor on or coupled to the EIR terminal 210, or at a remote processing resource, in a client-server or application service provider configuration.

Referring the FIG. 2, the system and method of the present invention is explained in reference to this technical architecture. In the explanation of the system and method, each time a bar code and/or the scanning of a bar code on a physical structure is referenced, one of skill in the art will recognize that this description also relates to the use of an RFID tag in addition to and/or in place of the bar code, and the scanning of the RFID tag in addition to and/or in place of the scanning of the bar code. The bar code is discussed in reference to FIG. 2 to aid in comprehension and in no way should be interpreted to limit the scope of the system and method disclosed.

Referring to FIG. 2, database 260 is depicted as a database residing on a single computer at a location remote from the EIR terminal 210. However, in further embodiments of the present invention, the functionality of database 260 is embodied by a local data storage resource within the EIR terminal 210. Those of skill in the art will recognize that the functionality of database 260 can be split over a number of physical locations and/or computers.

A "computer" herein shall refer to a programmable device for data processing and control, including a central processing unit (CPU), a memory, and at least one communication interface. For example, in one embodiment, a computer can be provided by a server running a single instance of a multi-tasking operating system. In an embodiment of FIG. 2, the accelerometer package 270 of FIG. 2 is an embedded computer in which there is a single instance of a single-threaded operating system.

In another embodiment, a computer can be provided by a virtual server, i.e., an isolated instance of a guest operating system running within a host operating system and accessed via a network connection. A "network" herein shall refer to a set of hardware and software components implementing a plurality of communication channels between two or more computers. Such communication channels may be implemented by either wired or wireless physical links. A network can be provided, e.g., by a local area network (LAN), or a wide area network (WAN). While different networks can be designated herein, it is recognized that a single network as seen from the application layer interface to the network layer of the OSI model can comprise a plurality of lower layer networks, i.e., what can be regarded as a single Internet Protocol network, can include a plurality of different physical networks.

Using the EIR terminal 210, in communication with the database 260, the mechanism for scanning images of decodable indicia 240 is used to scan a bar code affixed to the physical structure at a known set of coordinates, an initial point. The data encoded in the bar code is decoded and used by the EIR terminal 210 to query the database 260, to retrieve descriptive information about the physical structure, including at least the coordinates of the initial point and the physical dimensions of the physical structure.

This initial point provided by the bar code and/or RFID tag is represented by the physical coordinates at which the bar code is affixed to the physical structure. The initial point maps the reference frame of the accelerometer package to the "local reference frame" of the physical structure. For example, if the bar code and/or RFID tag is affixed to a given physical structure on the left side, 30 inches above the floor, then the initial point coordinates=(0, 30, 0) with units of "inches". At this initial point, X=0 (i.e. far left edge of physical structure), Y=30 (inches above the floor), and Z=0 (touching the front plane of the physical structure). The Z-axis coordinate is 0 at the initial point because the initial distance between the EIR terminal and the stationary object is defined to be zero; the initial point is established when the EIR terminal is in contact with the custom bar code and/or RFID tag. The initial distances along the X-axis and Y-axis are set to the values determined by the custom barcode and/or RFID tag that was scanned immediately prior to the occurrence of mechanical contact between the EIR terminal and the physical structure.

In addition to determining the location of the EIR terminal 210, the accelerometer package 270 can also assist in a determination of the orientation of the EIR terminal 210 at the initial point (and during later movements) in three dimensional space.

After the initial point is acquired, if the RFID reader 220 in the EIR terminal 210 can be utilized to scan for RFID tags affixed to items of inventory on the physical structure, the EIR terminal can trace the movement relative to the physical structure in a "local" frame of reference. This process is described in greater detail in FIG. 4. The EIR terminal can trace the movement relative to the physical structure in a "local" frame of reference whether or not the EIR terminal is being used to scan for RFID tags. However, the tracing of the movement of the EIR terminal is useful in this context on the present system and method.

In a another embodiment of the present invention, the data encoded in the bar code is decoded and used by the EIR terminal 210 to query a local resource, such as a database within the EIR terminal 210 (not shown), to retrieve descriptive information about the physical structure, including at least the coordinates of the bar code and/or RFID tag mounting location on the physical structure, and the physical dimensions of the physical structure. After this information has been acquired by the EIR terminal 210, the location of the bar code becomes the initial point. Then, if the RFID reader 220 in the EIR terminal 210 is moved in three dimensional space the EIR terminal can trace the movement relative to the physical structure in a "local" frame of reference.

In a another embodiment of the present invention, the data encoded in the bar code is decoded by the EIR terminal 210 and the decoded data contains descriptive information about the physical structure, including at least the coordinates of the bar code and/or RFID tag mounting location on the physical structure, and the physical dimensions of the physical structure. After this information has been acquired by the EIR terminal 210, the location of the bar code is used as the initial point. Then, if the RFID reader 220 in the EIR terminal 210 is moved in three dimensional space, the EIR terminal can trace the movement relative to the physical structure in a "local" frame of reference.

In an embodiment of the present invention, as motion-related data is obtained in the "local" frame of reference, it is stored in a storage resource, which can be internal or external to the EIIR terminal 210, including but not limited, the database 260. This motion-related data is utilized by the EIR terminal 210 to map the location of the EIR terminal 210 in the local frame of reference to its real world location relative to the initial point as the EIR terminal 210 moves through space.

The RFID reader 220 reads RFID tags associated with items on a physical structure. Because the position and orientation of the EIR terminal 210 relative to the initial point is known based on the motion-tracking data and the relative location of the initial point, the distance of the RFID reader 220 from RFID tags located proximate to the initial point, is determined. Utilizing this distance, the EIR terminal 210 sets the RFID transmit power level to the minimum level needed to read these RFID tags.

As discussed earlier, some embodiments of the present invention utilize RFID tags to supply data relating to the dimensions of physical structures and coordinates of the RFID tag on the physical structure in the same manner as the use of bar codes is discussed in reference to FIG. 2.

Figure 3:
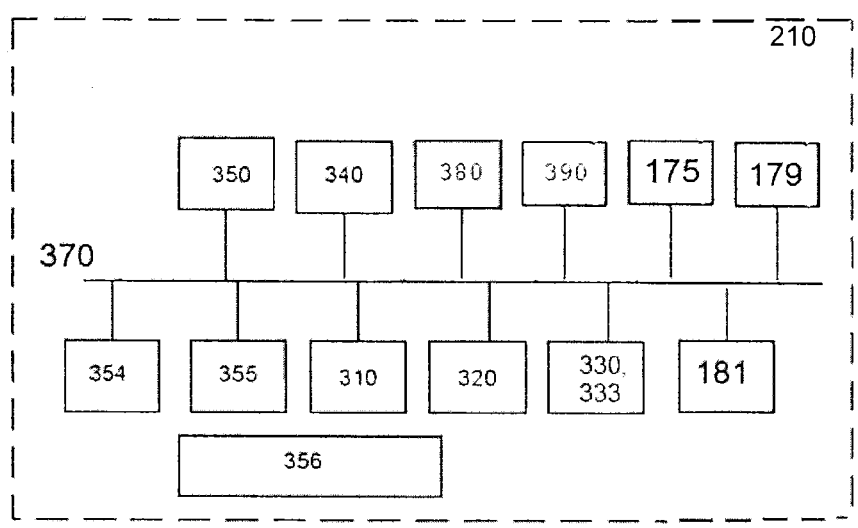
FIG. 3 depicts an embodiment of an aspect of the present invention.

A component-level diagram of an embodiment of the EIR terminal 210 is described with references to FIG. 3. The EIR terminal 210 can comprise at least one microprocessor 310 and a memory 320, both coupled to the system bus 370. The microprocessor 310 can be provided by a general purpose microprocessor or by a specialized microprocessor (e.g., an ASIC). In one embodiment, EIR terminal 210 can comprise a single microprocessor which can be referred to as a central processing unit (CPU). In another embodiment, EIR terminal 210 can comprise two or more microprocessors, for example, a CPU providing some or most of the EIR terminal functionality and a specialized microprocessor performing some specific functionality. A skilled artisan would appreciate the fact that other schemes of processing tasks distribution among two or more microprocessors are within the scope of this disclosure.

EIR terminal 210 can further comprise a communication interface 340 communicatively coupled to the system bus 370. In one embodiment, the communication interface can be provided by a wired or wireless communication interface. The wired or wireless communication interface can be configured to support, for example, but not limited to, the following protocols: at least one protocol of the IEEE 802.3, 802.11/802.15/802.16 protocol family, at least one protocol of the HSPA/GSM/GPRS/EDGE protocol family, TDMA protocol, UMTS protocol, LTE protocol, and/or at least one protocol of the CDMA/1xEV-DO protocol family.

EIR terminal 210 can further comprise a battery 356. In one embodiment, the battery 356 can be provided by a replaceable rechargeable battery pack. The EIR terminal 210 can further comprise a GPS receiver 380. The EIR terminal 210 can further comprise at least one connector 390 configured to receive a subscriber identity module (SIM) card.

The EIR terminal 210 can further comprise an imaging device 330, provided, for example, by a two-dimensional imager.

The EIR terminal 210 can further comprise one or more devices 330, 333 configured to decode a signal of decodable indicia, such as a bar code and/or an RFID tag. In one embodiment, a bar code scanner 333, such as an optical scanning device, can be configured to scan a bar code containing an encoded message and to output raw message data containing the encoded message. In another embodiment, the RFID reader 330 can be configured to read a memory of an RFID tag containing an encoded message and to output decoded message data corresponding to the encoded message. In a further embodiment, the RFID transmit power level of RFID reader 330 is controlled by EIR terminal 210. As used herein, "message" is intended to denote a bit sequence or a character string comprising alphanumeric and/or non-alphanumeric characters. An encoded message can be used to convey information, such as identification of the source and the model of an item, for example, in an EPC code.

Although devices 330, 333 are depicted in FIG. 3 in a single entity, one of skill in the art will recognize that in further embodiments of an EIR terminal 210 of the present invention could include devices that are not grouped together to handle imaging and reading RFID tags. The EIR terminal 210 of FIG. 3 is offered merely as an sample architecture.

In one embodiment, the EIR terminal 210 can further comprise a graphical user interface including a display adapter 175 and a keyboard 179. In one embodiment, the EIR terminal 210 can further comprise an audio output device, e.g., a speaker 181.

The keyboard 179 can be a full QWERTY keyboard and/or limited inputs that start and stop various activities, including, but not limited to scanning a bar code, scanning an RFID tag, initiating and stopping the collection of data from an accelerometer package. The keyboard 179 may be implemented as a touchscreen, discrete keys, or other methods, which in no way limit the scope of the invention.

EIR terminals include, but are not limited to cellular telephones, smart phones, PDAs, and/or other portable computing device that is capable of reading RFID tags and/or scanning bar codes.

Figure 4:
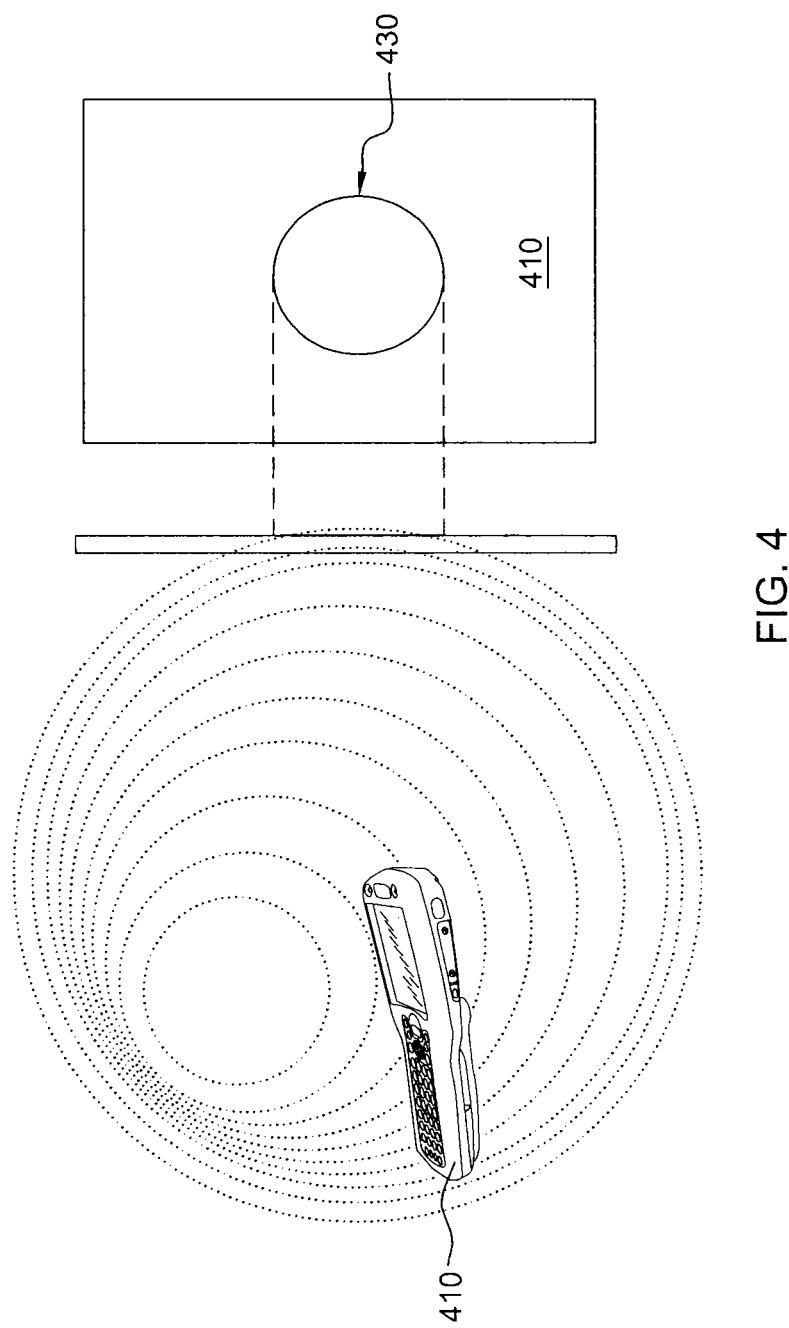
FIG. 4 depicts an aspect of an embodiment of the present invention.

FIG. 4 illustrates the factors that affect the diameter of a scan path at a physical structure. FIG. 4 depicts the EIR terminal 410 and a physical structure 420. Note that the scan path diameter 430, as depicted in FIG. 4, is determined by the sphere radius and the distance of the EIR terminal 410 from the physical structure 420. The sphere radius is a function of the transmit power level.

Figure 5:
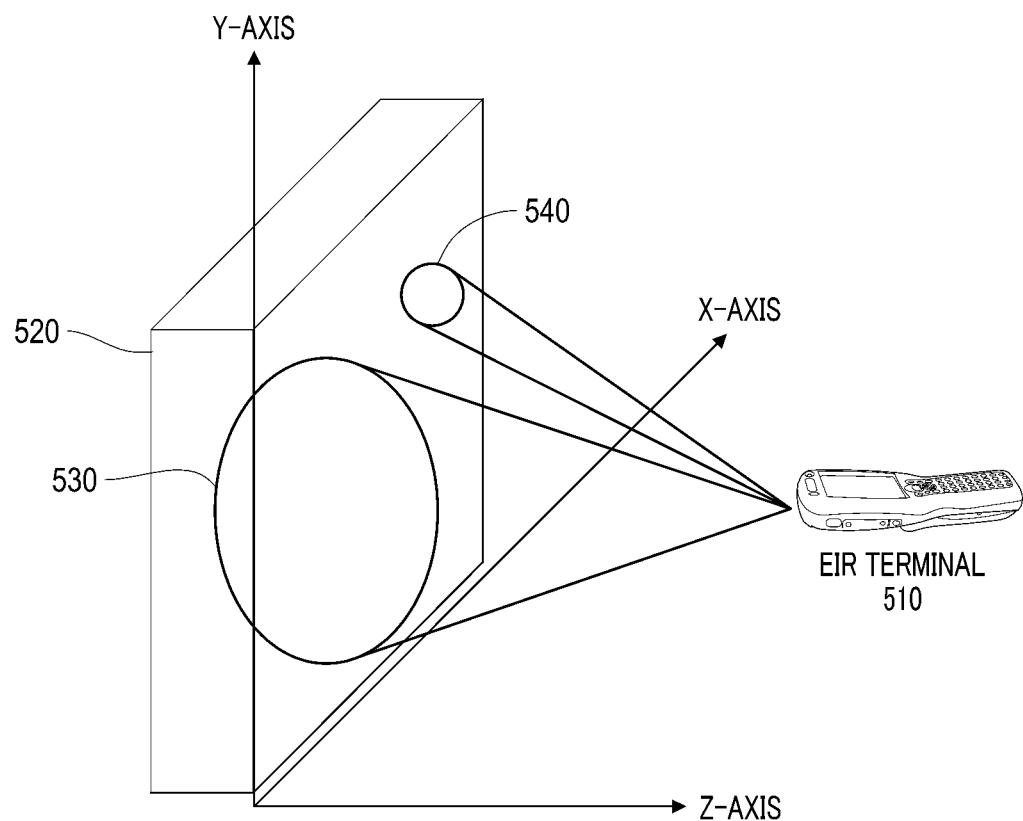
FIG. 5 depicts an aspect of an embodiment of the present invention.

FIG. 5 depicts the sphere radii of two different RFID transmit power levels when the EIR terminal 510 is positioned at a fixed distance from the physical structure 520. At the higher power level, the radius 530 is greater than at the lower power level, where the radius 540 is shorter.

Figure 6:
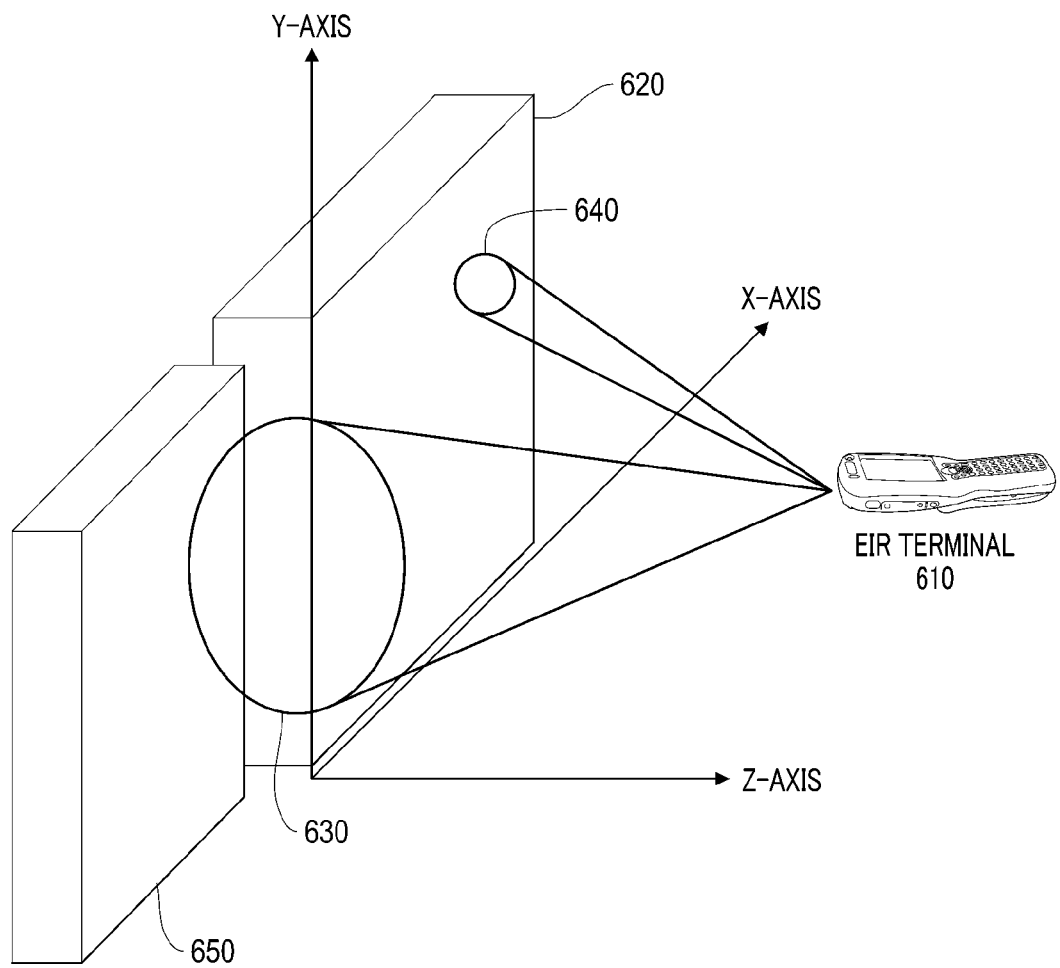
FIG. 6 depicts an aspect of an embodiment of the present invention.

By selecting the lowest possible transmit power level, not only is the battery power of the EIR terminal conserved, but the RFID tags that are read by the RFID reader are more easily limited to those on the intended physical structure. In FIG. 6, the physical structure 620 where RFID tags reside that the user desires to read is positioned near a second physical structure 650. At the higher transmit power level, the EIR terminal 610 projects a radius 630 that will read both the RFID tags on the physical structure 620 as well as, unintentionally, the RFID tags on the second physical structure 650. At the lower transmit power level, the radius 640 is such that only RFID tags on the intended physical structure 620 will be read.

Figure 7:
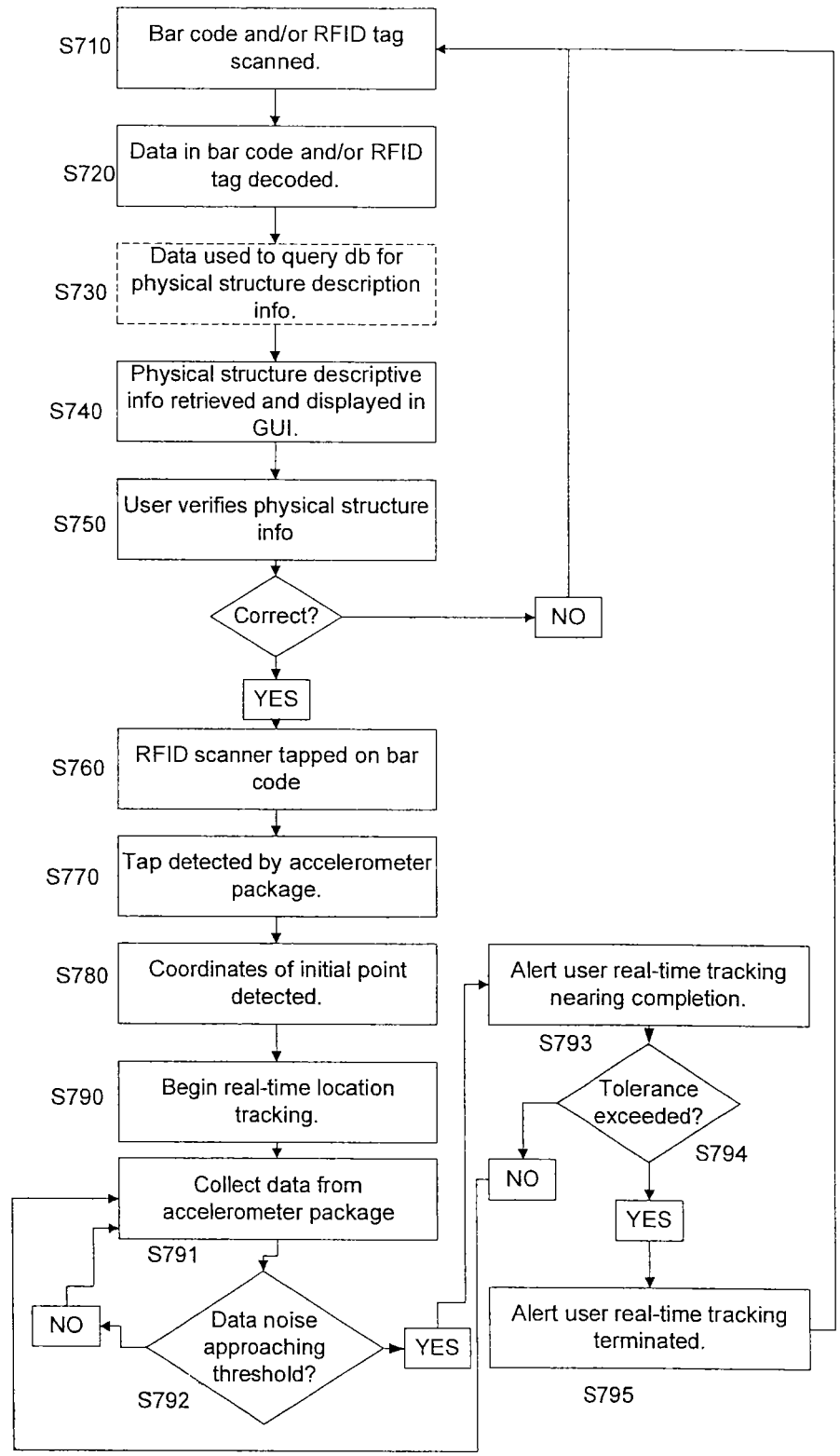
FIG. 7 depicts a workflow of an aspect of an embodiment of the present invention.

FIG. 7 depicts of a workflow 700 of an embodiment of the present invention accomplished utilizing the technical architecture of FIG. 2. This workflow 700 depicts the system and method of acquiring data to map the location of at least one object in three dimensional space, relative to an initial point in three dimensional space. In this workflow 700, the EIR terminal 210 acquires the information necessary to provide visual feedback to the user via the GUI 230 that provides the user with relative positioning data of the EIR terminal 210 in a local framework relative to a physical structure.

First, the mechanism for scanning images of decodable indicia 240 in the EIR terminal 210 is used to scan a custom bar code (S710). Encoded in this custom bar code is data describing a physical structure upon which inventory to be tracked may be exhibited. Provided that the bar code is unique, and/or unique for each physical structure type, additional information about the physical structure can be retrieved from the database 260 using an identifier encoded in the bar code, as the bar code is a primary key or the database is indexed by information decoded from the bar code.

As discussed in reference to FIG. 2, the custom bar code may contain all the descriptive information or it may be a key to looking up the full information in a local or remote data source.

The custom bar codes associated with various physical structures are placed on these physical structures. The physical location of each custom bar code on a given physical structure becomes a location that is used in mapping. The bar code location on the physical structure matches the initial point coordinates; it is obtained either directly from the bar code, or indirectly from a database.

After utilizing the mechanism for scanning images of decodable indicia 240 in the EIR terminal 210 to scan a custom bar code (S710), the data is decoded (S720) using program code executed on a processor within the EIR terminal 210, or using program code on a resource accessible to the EIR terminal 210, in a client-server-type configuration.

The program code for execution can be stored either on a resource or resources internal to the EIR terminal 210, on a resource or resources accessible to the EIR terminal 210, but external, or on a combination of both internal and external resources.

Once decoded, the decoded data is used to query the database 260 over the wireless network connection 250 to retrieve additional information about the physical structure, including but not limited to, the number of physical shelves/bars, as well as the dimensions of the physical structure, which are stored in the database 260, which in this embodiment, is indexed by bar code (S730). The wireless network connection 250 is not limited to this specific communications connection and can include other communications connections, including an intranet connection and an internet connection. At least some of the information that is retrieved is displayed in the GUI 230 (S740).

Although the embodiment of FIG. 7 includes a database lookup S730, this step is optional as further embodiments of the present invention do not contain this step. To symbolize the optional nature of this step, the box in the workflow 700 is depicted as a broken line.

In another embodiment of the present invention (not pictured), the mechanism for scanning images of decodable indicia 240 in the EIR terminal 210 is used to scan a custom bar code, and encoded in the bar code itself is data describing the physical structure. Like in FIG. 7, at least some of this data is displayed in the GUI 230 (S740) for user verification.

In another embodiment of the present invention (not pictured), the mechanism for scanning images of decodable indicia 240 in the EIR terminal 210 is used to scan a custom bar code, and data describing the physical structure is retrieved by the EIR terminal 210 from a storage resource that is local to the EIR terminal 210. Like in FIG. 7, at least some of this data is displayed in the GUI 230 for user verification.

In an embodiment of the present invention, the database also stores the physical location of the custom bar code on the physical structure. In embodiments where this information is stored, the location of the custom bar code can be displayed on the GUI 230 to guide the user of the EIR terminal 210 during calibration and/or re-calibration activities.

The information displayed in the GUI 230 includes, but is not limited to, the type of physical structure (numbers of shelves/bars), and the location of the custom bar code on the physical structure. The user can verify the displayed information using the GUI (S750). In embodiments of the present invention, the GUI 230 renders this information as one or more images, descriptive text, and/or a combination of image(s) and text. If the information in the GUI is incorrect in that it is not representative of the physical structure with the custom bar code that was scanned, the user can re-scan the bar code on the physical structure (S710).

In an embodiment of the present invention, to complete calibration of the physical structure with the scanned custom bar code, the EIR terminal 210 is "tapped" on the custom bar code (S760). To "tap," the user follows the red laser light of the bar code scanner 240 to the bar code and touches the bar code scanner 240 to the printed bar code on the physical structure. In another embodiment of the present invention, the tap can be accomplished without the use of the laser guide. In this embodiment, the user performs a mechanical tap at a predetermined location, i.e., the location of the custom bar code.

This "tap" creates a spike in the accelerometer data. This spike is detected by the 3D accelerometer package 270 in the EIR terminal 210 (S770). Upon detection, the EIR terminal stores the coordinates as an initial point (S780) in the local reference frame (x0, y0, z0). In the EIR terminal reference frame, the current coordinates are set to (0,0,0). Thus, as the EIR terminal 210 (and therefore the accelerometer package 270) moves, the motion data with respect to the (0,0,0) coordinates can be mapped to the local reference frame using the initial point coordinates (x0,y0,z0). In another embodiment of the present invention, instead of scanning a bar code before "tapping," the RFID reader 220 in the EIR terminal 210 can be utilized to read an RFID tag affixed to a designated location on a physical structure. In this embodiment, the location of this RFID tag is "tapped" to set the initial point coordinates.

In another embodiment of the present invention, the "spike" in the accelerometer data can be used to determine the orientation of the EIR terminal relative to the physical structure. In this embodiment, the initial orientation data is used to establish the initial orientation of the EIR terminal, and align the EIR terminal frame of reference with the local frame of reference relative to the physical structure. In an embodiment of the EIR terminal that includes 3-axis magnetometers, and 3-axis gyroscopes, these devices assist in determining the orientation of the physical structure.

In an embodiment of the present invention, the local reference frame (real) coordinates of the location of a bar code or RFID tag on a physical structure can be included in the encoded data within the bar code or RFID tag. In this embodiment, when the EIR terminal scans the bar code or RFID tag, it acquires the (x0,y0,z0) coordinates in the local reference frame. As aforementioned, in another embodiment of the present invention, the local reference frame coordinates can also be stored in a resource either external or internal to the EIR terminal. In this embodiment, the RFID tag or custom bar code affixed to the physical structure contains sufficient data to query the resource for additional information, including the coordinates of the scanned bar code or RFID tag.

In this workflow 700, in the "scan" portion S710, an EIR terminal scans a signal of decodable indicia, such as a bar code or RFID tag, and this EIR terminal reads the coordinates of the signal in the local reference frame. During the "tap," S760, i.e., tapping the EIR terminal at the location of the signal of decodable indicia, the resultant spike in the accelerometer data causes the initial point coordinates (x0, y0, z0) to be stored S780. In the local reference frame, the coordinates are set to (x0y,0,z0). Thus, as the EIR terminal moves through three-dimensional space, motion with respect to the EIR terminal's own (0,0,0) can be mapped to the local reference frame using the initial point coordinates (x0, y0, z0).

After the "scan" and "tap" steps are complete, the 3D accelerometer package 270 in the EIR terminal 210 can be used to begin real-time location tracking of the EIR terminal's position (S790) because the EIR terminal reference frame has been mapped to the local reference frame. The scan path of the EIR terminal 210 is mapped using the 3D accelerometer package 270, which outputs data used to map the path of the EIR terminal relative to the location of the initial point (x0, y0, z0). As the user moves the RFID reader 220 through three dimensional space to, for example, read RFID tags, the collected accelerometer data is used to track the movement. Movement is measured by the 3-axis accelerometer package 270 in "real" units of RFID reader 220 movement, which must be "mapped" appropriately to the initial point and scaled for display by the GUI 230. Data is collected from the accelerometer package during movement (S791).

In embodiments of the present invention that utilize either accelerometer package 270 or IMU-based location tracking, there is a finite period of time during which the IMU data has adequate accuracy. This time period begins at the "tap" (S760), and ends when a pre-defined error tolerance is exceeded.

As location data is collected (S791), the EIR terminal checks whether the noise level in the collected data is approaching the noise threshold (S792). If the noise level is below the threshold, the data collection continues (S791) until the data noise approaches the threshold.

In an embodiment of the present invention that additionally collects data regarding the orientation of the EIR terminal, this data can also contribute to the noise threshold.

In an embodiment of the present invention, when the data noise level approaches the threshold and the motion tracking is about to end and/or when the actual tracking has ceased, the user is notified via an audible and/or visible signal. First, the EIR terminal will deliver an audible and/or visual warning that the motion tracking is about to end (S793). If the conditional test for error tolerance reveals that the tolerance has been exceeded (S794), the EIR terminal delivers an audible and/or visual notification (S795). Should a user who receives the "end of tracking" notification desire to resume motion tracking, the user can repeat the scan and tap processes with the EIR terminal 210 (S710).

In the event of inherent accelerometer noise exceeding a preset threshold, the GUI 230 prompts the user to re-calibrate, re-read the barcode with the scanning mechanism 240 and re-tap the RFID reader 220 (S710). In one embodiment of the present invention, the prompt is an audible cue, rather than a visual cue. The audible and visual cue (in the GUI 230), are combined in another embodiment of the present invention.

Calibration of the EIR terminal 210 can be helpful during inventory scanning to increase speed and accuracy.

As aforementioned, the EIR terminal 210 is used for scanning bar codes as well as reading RFID tags. The usability of the EIR terminal 210 when performing these functions, and the ability to seamlessly alternate between these functions when scanning and then tapping, affects the efficiency of the process. The EIR terminal 210 can be configured in different manners to increase its usability. In an embodiment of the present invention, the EIR terminal 210 has an input that initiates both the RFID scanning and bar code scanning functionality when selected at one time. Inputs include but are not limited to touchscreen, triggers, buttons, and/or keys. The input can be selected by pressing a trigger and/or depressing (or releasing) a button or key. In another embodiment, the user selects an input one time to scan the custom bar code, releases the input to confirm the information retrieved from the database 260 that appears in the GUI 230, and selects the input a second time to activate the RFID reader 220. In this embodiment, the 3-axis accelerometer package 270 is active constantly from the initial trigger activation.

In an embodiment of the present invention, the RFID reader and the bar code scanner are not active at the same time. First, the bar code scanner is enabled, then turned off following the "tap", at which time the RFID reader is enabled and later turned off when either the accelerometer error grows too large or the stop input is pressed/released.

Figure 8:
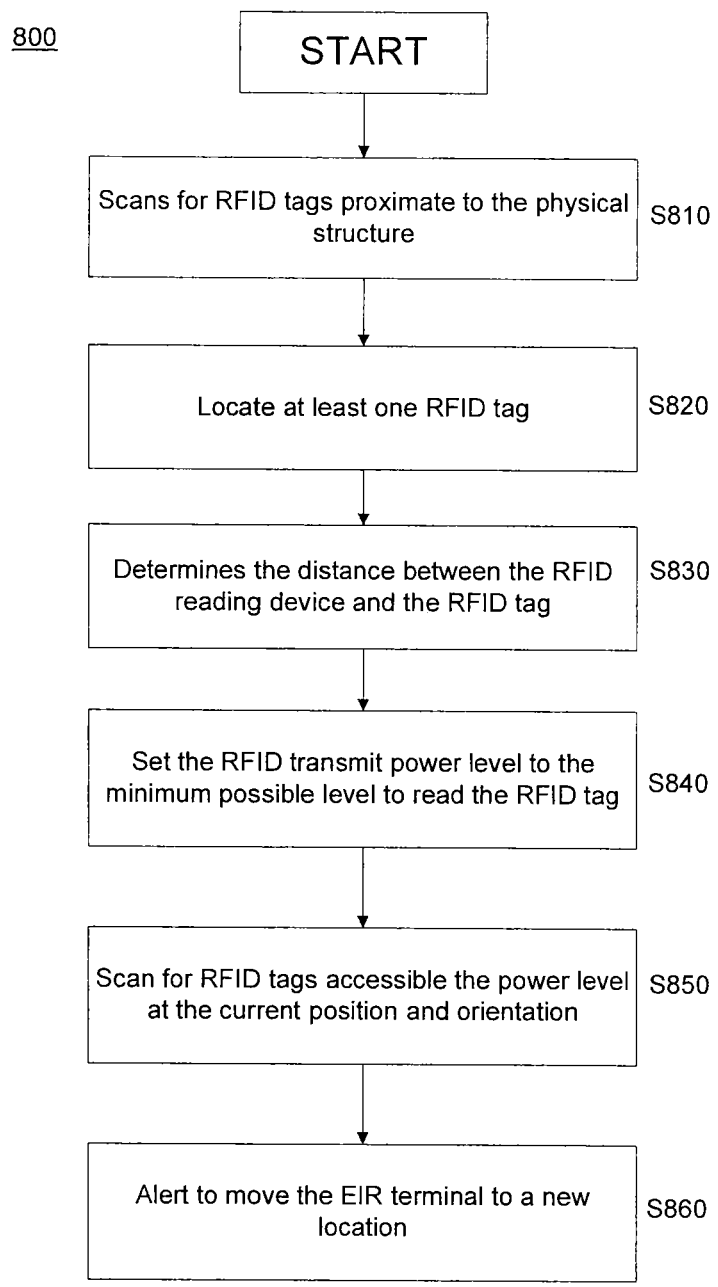
FIG. 8 depicts a workflow of an aspect of an embodiment of the present invention.
Figure 9A:
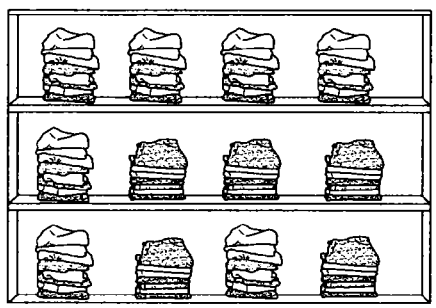
FIGS. 9a-9f depict various embodiments of an aspect of the present invention.
Figure 9B:
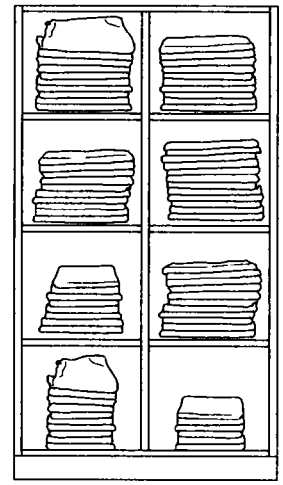
Figure 9C:
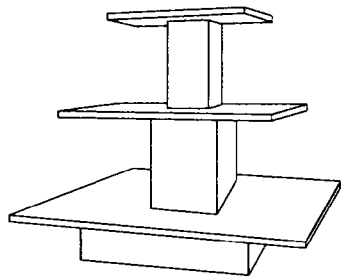
Figure 9D:
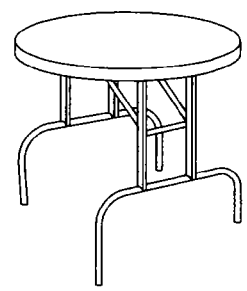
Figure 9E:
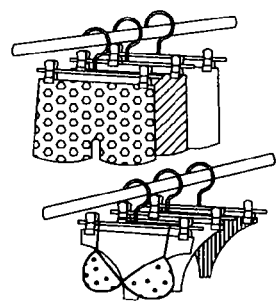
Figure 9F:
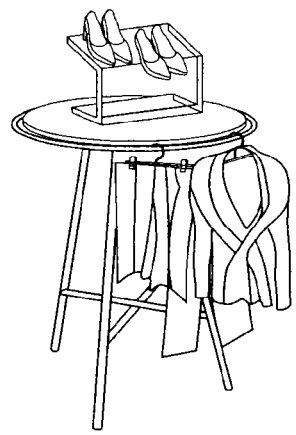

Once the workflow of FIG. 7 is complete, the EIR terminal has obtained both motion-tracking data and the location of an initial point on the physical structure. Thus, the distance of the EIR terminal 210 from the initial point of the physical structure is known as the EIR terminal 210 moves through space. FIG. 8 depicts a workflow 800 of an embodiment of the present invention in setting the transmit power level on the RFID reader 220 in order to efficiently and accurately scan RFID tags located proximate to a physical structure, e.g., scanning RFID tags on merchandise displayed on the physical structure. FIGS. 9a-9f are non-exclusive example of various physical structures and the RFID tagged merchandise on these physical structures that can be scanned during the workflow of FIG. 8. Physical structures that can be scanned by an embodiment of the present invention include but are not limited to rectangular shelving units, circular hanging racks, linear racks, and tables or varying shapes and sizes.

At the START of FIG. 8, the EIR terminal has established an initial point and can map its movement in the local frame of reference of a physical structure, i.e., the EIR terminal 210 has motion-tracking data. In this embodiment, at a given position and orientation in space, the EIR terminal's 210 RFID reader 220 scans for RFID tags proximate to the physical structure (S810). The RFID reader 220 locates at least one RFID tag (S820). Utilizing the motion-tracking data and the known initial point, the EIR terminal 210, i.e. a processor in the EIR terminal 210 executing computer code, determines the distance between the RFID reader 220 and the RFID tag (S830). The EIR terminal 210 sets the RFID transmit power level to the minimum possible level to read the tag (S840). In another embodiment of the present invention, a user may be prompted to manually adjust the power level.

After an initial power level is set, the user of the EIR terminal 210 scans for RFID tags accessible at this power level at the current position and orientation (S850). Once all the RFID tags accessible from this location and orientation are scanned, the user is alerted either audibly, or through the GUI or both, to move the EIR terminal 210 to a new location (S860). As the EIR terminal is moved through space, the motion is continuously tracked as explained in FIG. 4. At a new location, the EIR terminal 210 may re-set (or the user may re-set) the power level of the RFID reader 220 to accommodate a new distance.

In an embodiment of the present invention, the EIR terminal 210 alerts the user (audibly and/or through the GUI) if he/she is not holding the EIR terminal 210 steady. By holding the EIR terminal 210 at a consistent distance and orientation, the tags read are consistent.

In an embodiment of the present invention, the minimum power levels at various locations relative to a physical structure are tracked in memory in either an internal and/or an external resource. Thus, the EIR terminal 210 need to re-establish the power level for scanning at a given location each time this activity is attempted.

An embodiment of the present invention can be utilized to physically locate any (or all) RFID tags and/or a specific RFID tag. FIG. 10 depicts a workflow 1000 of this activity.

Figure 11:
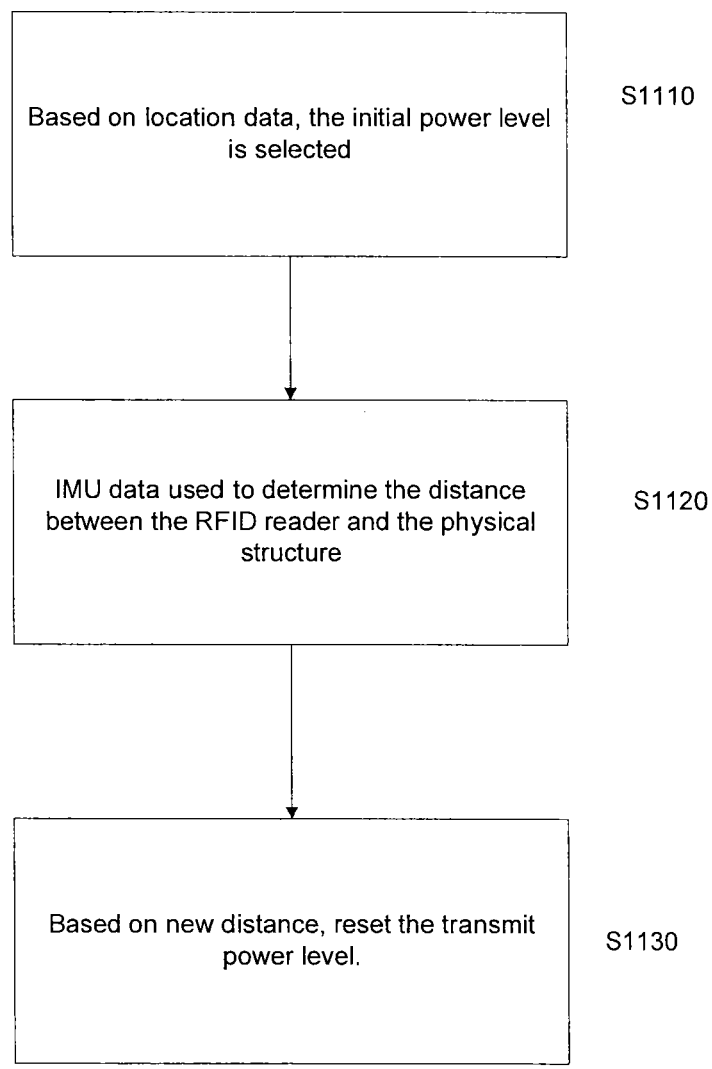
FIG. 11 depicts a workflow of an aspect of an embodiment of the present invention.
Figure 12:
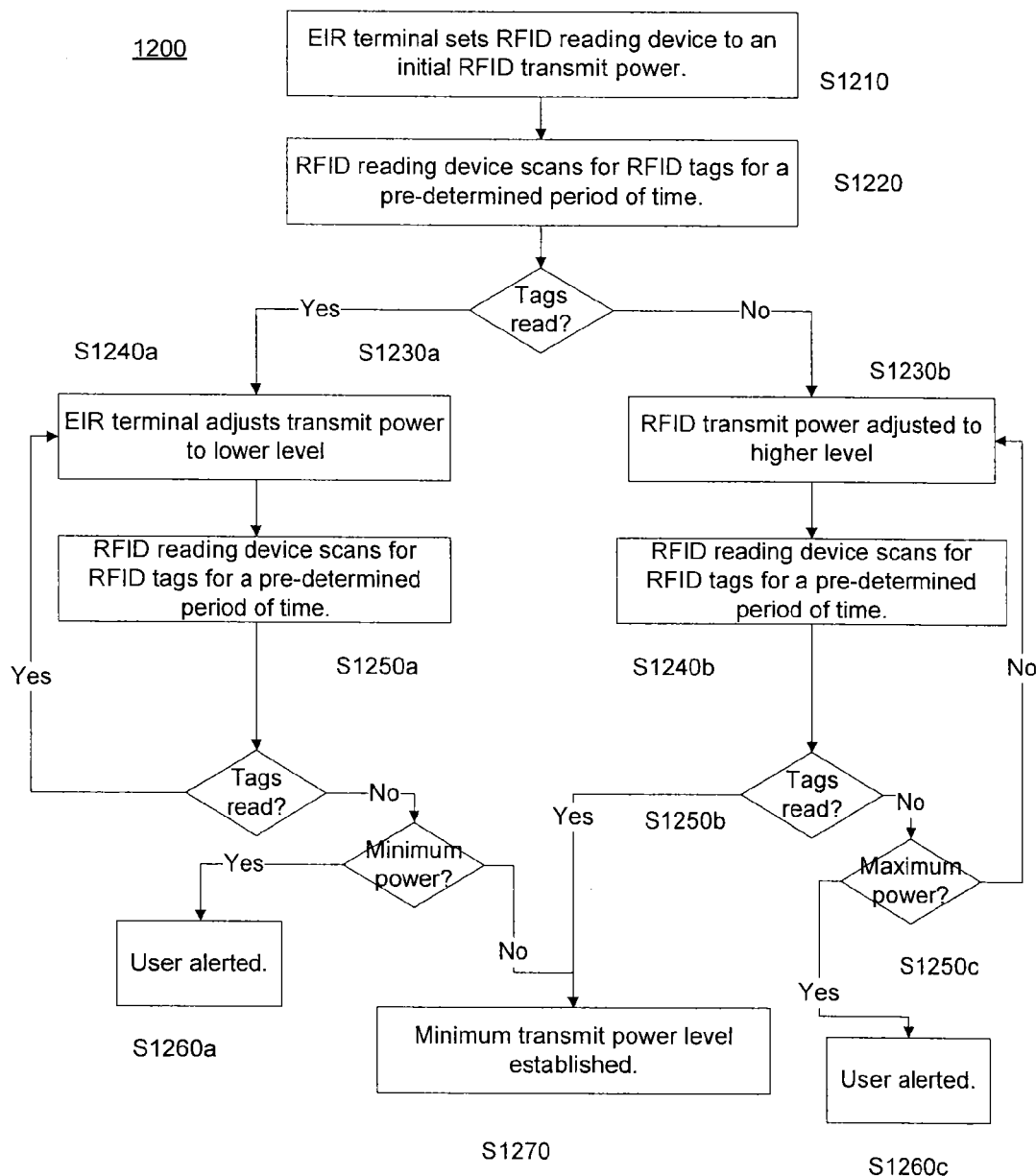
FIG. 12 depicts a workflow of an aspect of an embodiment of the present invention.

Referring to FIG. 10, the RFID reader 220 in the EIR terminal 210 in this embodiment has more than one antenna and each antenna has a different radiation pattern. First, an antenna with a wide radiation pattern is selected (S1010). This antenna is set to the lowest RFID transmit power level (S1020). The user is prompted to manually scan (S1030). When the specific tag or any tag (depending on the activity) is detected, the user is alerted through the GUI of the approximate distance to the tag or tags (S1040). Then, the RFID reader 220 is switched to an antenna with a narrow radiation pattern, using an RFID transmit power level equivalent to initial search power level (S1050). The user is prompted to manually scan the tag(s) (S1060). As aforementioned, the RFID transmit power level with and without utilization of motion-tracking data (e.g., IMU data) to adjust the RFID transmit power level. FIG. 11 depicts the workflow 1100 of an embodiment of the present invention that utilizes motion-tracking data. FIG. 12 is a workflow 1200 of an embodiment of the present invention that does not utilize motion-tracking data.

Referring to FIG. 11, based on location data, the initial power level is selected (S1110). In this embodiment, the factory calibration establishes the relationship between the RFID transmit power level and the distance at which RFID tags can be read successfully. This read distance, is a function of various factors, including but not limited to, antenna type and RFID reader assembly. The EIR terminal dynamically adjusts the RFID transmit power in response to the IMU data.

After an initial power level is selected, in this embodiment, at selected time intervals, the IMU data is used to determine the distance between the RFID reader and the physical structure (the initial point) (S1120). At a new distance, the EIR terminal will re-set the transmit power level of the RFID reader (S1130). As the user moves the EIR terminal through space while scanning, the distance will change and the power setting may no longer be the most appropriate. In an embodiment of the present invention, the EIR terminal will automatically and dynamically set the transmit power level of the RFID reader to the lowest possible RFID transmit power level possible in order to scan the RFID tags in a targeted and power-conserving manner dependent upon the distance. Thus, over time, the EIR terminal will set the RFID transmit power level to the lowest effective level for the IMU-indicated distance.

Referring to FIG. 12, there is no motion-tracking data available to determine the distance of the EIR terminal from a physical structure. Thus, the EIR terminal sets the RFID reader to an initial power RFID transmit power at the onset (S1210). This initial power level can be either a low level or a high level. The results at the end of the adjustment process it to find the lowest transmit power level possible to read a given RFID tag or group of RFID tags. As seen in this process, if this initial level is a high level, i.e., there are power levels that are lower and the RFID reader is capable of operating at those levels, the RFID transmit power is incrementally adjusted downward by the EIR terminal to find the minimum power level. In contrast, if the initial transmit power level is a low power level, i.e., there are power levels that the RFID reader transmits at that are above this level, if this initial low level is not effective at reading the desired RFID tag(s), the EIR terminal will incrementally adjust the power upwards until a minimum power level is reached. If at any point during this process the minimum and/or maximum power level that the RFID reader is capable of emitting is reached and the desire RFID tag(s) are not readable at the power level, the user will be alerted by the terminal. This alert may be audible and/or visual.

The RFID reader then scans for RFID tags (S1220). After a designated period of time, if no RFID tags are read by the RFID reader, the EIR terminal increases the transmit power level of the RFID reader (S1230 *b*). If time elapses and no tags are read (S1240 *b*), the power is increased again, with these steps repeating until RFID tags are read (S1250 *b*) and/or the maximum transmit power is reached (S1250 *c*). If the maximum power level has been reached and no tags have been scanned, the user is notified either visually or audibly by the EIR terminal (S1260 *c*). When tags are read at a level, When the tags are read at a given power level, the minimum transmit power level at a given distance is established (S1270).

When tags are read at a power level (S1230 *a*), the ER terminal sets the transmit power level incrementally lower to achieve the lowest possible level (S1240 *a*). The RFID reader scans for RFID tags are this new, lower power level for a given period of time (S1250 *a*). This procedure is repeated to find the lowest effective level (S1270). If the minimum transmit power level that the RFID reader is capable of transmitting at is reached, the user is alerted (S1260 *a*). In one embodiment of the present invention, the decision of the ER terminal to decrement or increment the power level is based on the number of tags read at the present setting. When the adjustment of the power level exceeds the threshold where tags can be read, the minimum transmit power level at a given distance is known (S1270).

Computer-readable code or instructions need not reside on the enumerated computer systems: database 260 and EIR terminal 210 of FIG. 2. Referring to FIG. 13, in one example, a computer program product 1300 includes, for instance, one or more non-transitory computer readable storage media 1302 to store computer readable program code means or logic 1304 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language, assembler or similar programming languages. The program code may execute entirely on one resource of a data processing and storage system, such as a cloud, partly on various resources, and/or partly on the EIR terminal and partly on one or more resources of the data processing and storage system.

One or more aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiment with various modifications as are suited to the particular use contemplated.

Although the present invention has been described in relation to particular embodiments thereof, many other variations and modifications will become apparent to those skilled in the art. As such, it will be readily evident to one of skill in the art based on the detailed description of the presently preferred embodiment of the system and method explained herein, that different embodiments can be realized.

What is claimed is:

1. A method of adjusting a transmission strength emitted by an RFID reader, the method comprising:
    scanning, by the RFID reader, a space for predetermined period of time at a first power level;
    storing, in memory of the RFID reader, a first location of as a point of origin;
    changing, by the RFID reader, the power level of the RFID reader to a second power level based on a distance of the RFID reader from the point of origin after the RFID reader is moved from the point of origin; and
    scanning, by the RFID reader, the space for predetermined period of time at a second power level.

2. The method of claim 1, wherein the second power level is lower than the first power level.

3. The method of claim 1, wherein the second power level is higher than the first power level.

4. The method of claim 3, further comprising: communicating an alert when the second power level is a maximum power level of the RFID reader.

5. The method of claim 2, further comprising: communicating an alert when the second power level is a minimum power level of the RFID reader.

6. A method of adjusting the transmission strength emitted by an integrated RFID reader, the method comprising:
    scanning, by the RFID reader, a signal of decodable indicia wherein the signal of decodable indicia is located on or proximate to an area of a physical object;
    responsive to scanning the signal of decodable indicia and responsive to the RFID reader being proximate to the area of the physical object, identifying, as a point of origin, a first location associated with the area;
    responsive to moving the RFID reader relative to the first location, determining, based on data received from a motion sensing device, a distance of the RFID reader from the point of origin; and
    adjusting a power level of the RFID reader relative to the determined distance of the RFID reader relative to the point of origin.

7. The method of claim 6, wherein the motion sensing device is provided by a 9 degree of freedom Inertial Measurement Unit, wherein the 9 degree of freedom Inertial Measurement Unit comprises a 3-axis accelerometer, a 3-axis magnetometer, and a 3-axis gyroscope.

8. The method of claim 6, further comprising providing at least one of: an optical scanner and a camera.

9. The method of claim 6, further comprising
    responsive to scanning the signal of decodable indicia, locating the decodable indicia within the signal;
    responsive to locating the decodable indicia within the signal, decoding the decodable indicia into a decoded message
    wherein the decoded message comprises: an identifier for the physical object; and
    displaying the identifier for the physical object.

10. The method of claim 6, wherein the responsive to scanning the signal of decodable indicia and responsive to the RFID reader being proximate to the area of the physical object, identifying, as a point of origin, a first location associated with the area comprises:
    responsive to scanning the signal of decodable indicia:
        responsive to detecting a communication interface command, making mechanical contact with the area of the physical object; and
        responsive to making mechanical contact with the area of the physical object, storing in memory the first location as a point of origin.

11. The method of claim 6, further comprising
    moving the RFID reader relative to the physical object; and
    receiving values from the motion sensing device representing a location of the RFID reader relative to the point of origin; and
    determining a distance of the RFID reader from the point of origin.

12. An apparatus comprising:
    a scanning device that scans a signal of decodable indicia on an area associated with a physical object,
    an RFID reader transmitting at a power level;
    a motion sensing device;
    wherein responsive to scanning the signal of decodable indicia and responsive to the RFID reader being proximate to the area of the physical object, a point of origin is identified with a first location associated with the area;
    wherein, in response to moving the RFID reader relative to the first location and based on data received from a motion sensing device, a distance of the RFID reader from the point of origin is determined; and
    wherein, in response to determining the distance, the power level of the RFID reader is adjusted relative to the distance.

13. The apparatus of claim 12, wherein the adjusted transmit power level is the lowest available to read an RFID tag at the distance.

14. The apparatus of claim 12, wherein the motion sensing device is provided by a 9 degree of freedom Inertial Measurement Unit, wherein the 9 degree of freedom Inertial Measurement Unit comprises a 3-axis accelerometer, a 3-axis magnetometer, and a 3-axis gyroscope.

15. The apparatus of claim 12, wherein the scanning device is provided by at least one of: an optical scanner and a camera.

16. The apparatus of claim 12, wherein the communication interface comprises a graphical user interface and a wireless network connection.

17. The apparatus of claim 12, wherein the scanning device locates the decodable indicia within the signal of decodable indicia, decodes the decodable indicia into a decoded message, and outputs the decoded message, wherein the decoded message contains information associated with the physical object.

18. The apparatus of claim 17, further comprising
    a communication interface that receives the decoded message and displays the information describing the physical object.

19. The apparatus of claim 12, wherein the scanning device is part of the RFID reader.

20. The apparatus of claim 12, wherein the wherein in response to moving the RFID reader relative to the first location and based on data received from a motion sensing device, a distance of the RFID reader from the point of origin is determined, comprises:
  responsive to moving the RFID reader relative to the first location, determining, based on data received from a motion sensing device, a distance of the RFID reader from the point of origin.

* * * * *